Sept. 21, 1965  J. W. MASAVAGE  3,207,985
MEASURING DEVICE WITH CHANGEABLE SCALE FOR
CHANGING THE RATE OF MEASUREMENT
Filed Oct. 28, 1960  4 Sheets-Sheet 1

INVENTOR
Joseph W. Masavage

BY *C. L. Freedman*

ATTORNEY

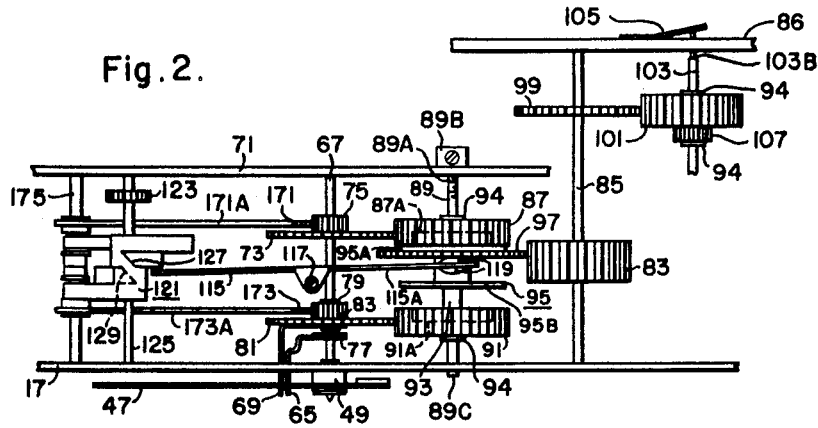
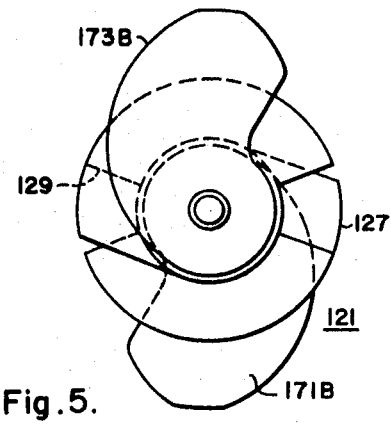
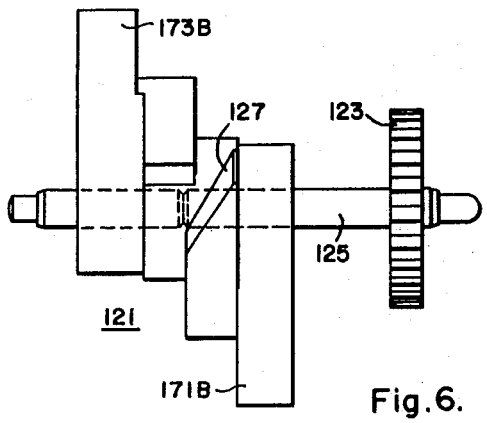
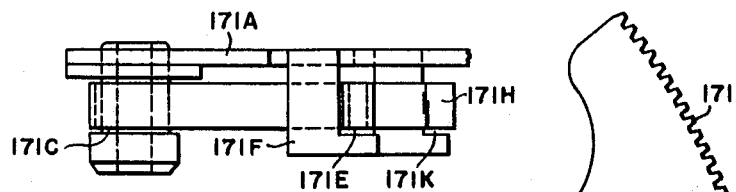
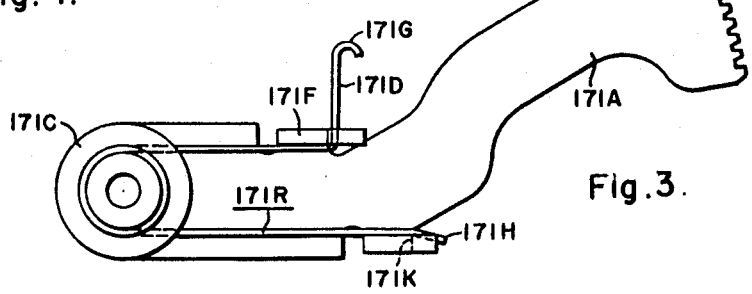

Sept. 21, 1965  J. W. MASAVAGE  3,207,985
MEASURING DEVICE WITH CHANGEABLE SCALE FOR
CHANGING THE RATE OF MEASUREMENT
Filed Oct. 28, 1960  4 Sheets-Sheet 3

United States Patent Office

3,207,985
Patented Sept. 21, 1965

1

3,207,985
MEASURING DEVICE WITH CHANGEABLE
SCALE FOR CHANGING THE RATE OF
MEASUREMENT
Joseph W. Masavage, Raleigh, N.C., assignor to Westinghouse Electric Corporation, East Pittsburgh, Pa., a corporation of Pennsylvania
Filed Oct. 28, 1960, Ser. No. 65,654
5 Claims. (Cl. 324—115)

This invention relates to measuring devices and it has particular relation to dual-range measuring devices for measuring a variable quantity.

In accordance with a preferred embodiment of the invention a coupling member is mounted for rotation relative to a shaft which is axially-movable between two positions. Such axial movement alters the coupling between driving and driven members to vary the range of a measuring instrument.

The measuring instrument is provided with two selectively-effective scales. When a first scale is in effective condition the axially-movable shaft is biased into a first position to provide a range suitable for the first scale. When a second scale is in effective condition the axially-movable shaft is moved against its bias to a second position, to provide a range suitable for the second scale.

It is, therefore, an object of the invention to provide an improved dual-range measuring device.

Other objects of the invention will be apparent from the following description taken in conjunction with the accompanying drawings, in which:

FIG. 2 is a view in top plan with parts broken away showing a portion of the measuring device of FIG. 1;

FIG. 3 is a view in front elevation of a resetting member employed in the measuring device of FIG. 1;

FIG. 4 is a view in top plan with parts broken away of the resetting member shown in FIG. 3;

FIG. 5 is a view in front elevation of a control unit employed in the measuring device of FIG. 1, but rotated 90° from the position shown in FIG. 1;

FIG. 6 is a view in top plan of the control unit shown in FIG. 5;

Figure 9:
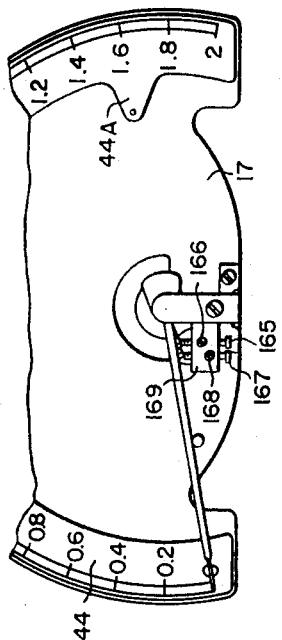
FIG. 9 is a view in front elevation with parts broken away of the measuring device shown in FIG. 1, but with a scale member employed in the device reversed.

The invention will be described as applied to the measuring device shown in the Eugene C. Benbow patent application, Serial No. 30,598, filed May 20, 1960 and assigned to the same assignee as the present patent application. This Benbow patent application issued on June 9, 1964, as Patent No. 3,136,947. Features of the measuring device shown herein are claimed in the Benbow application. FIGS. 1 to 9 inclusive are reproductions of FIGS. 1 to 9 of the Benbow application and have the same reference characters. Consequently, reference may be made to the Benbow application for a more complete description of the device and its operation. However, for convenience, the following description of certain features is presented.

Figure 1:
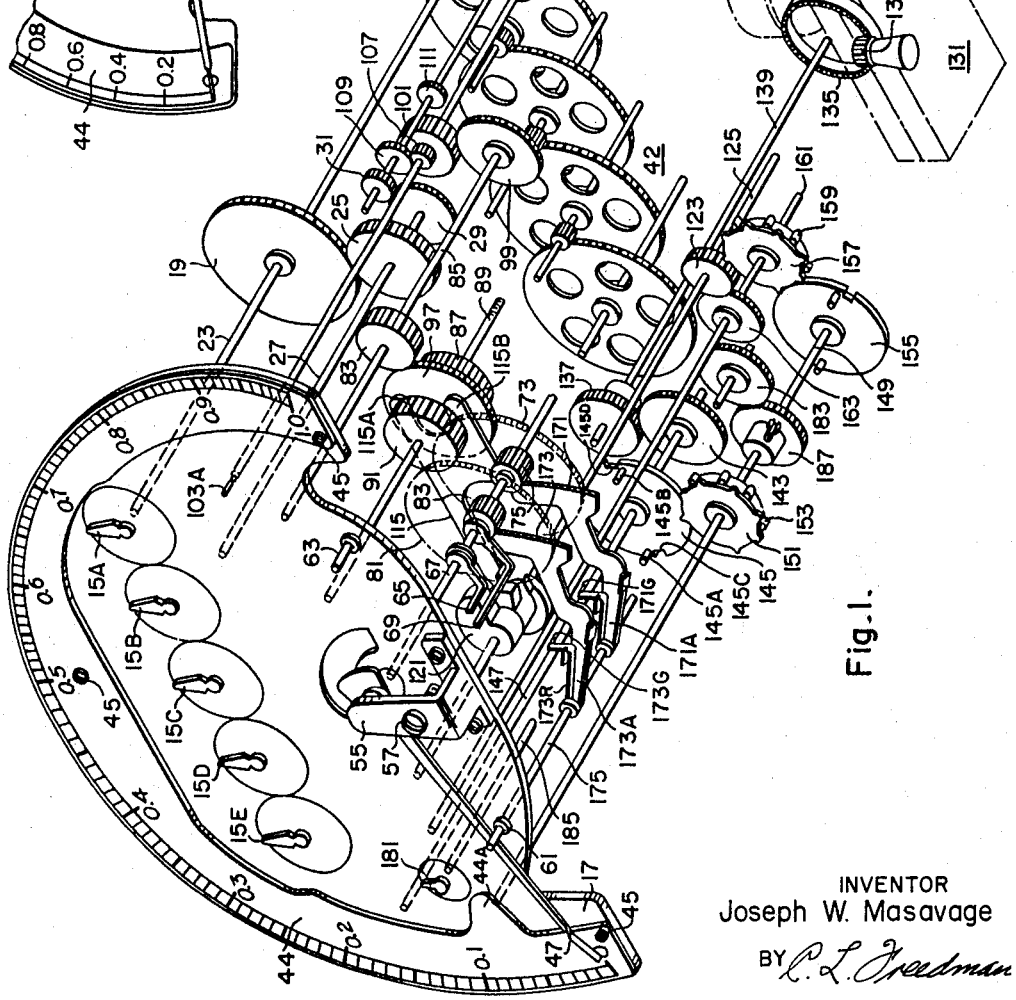
FIGURE 1 is a view in perspective of a measuring device embodying the invention with parts broken away.
Figure 7:
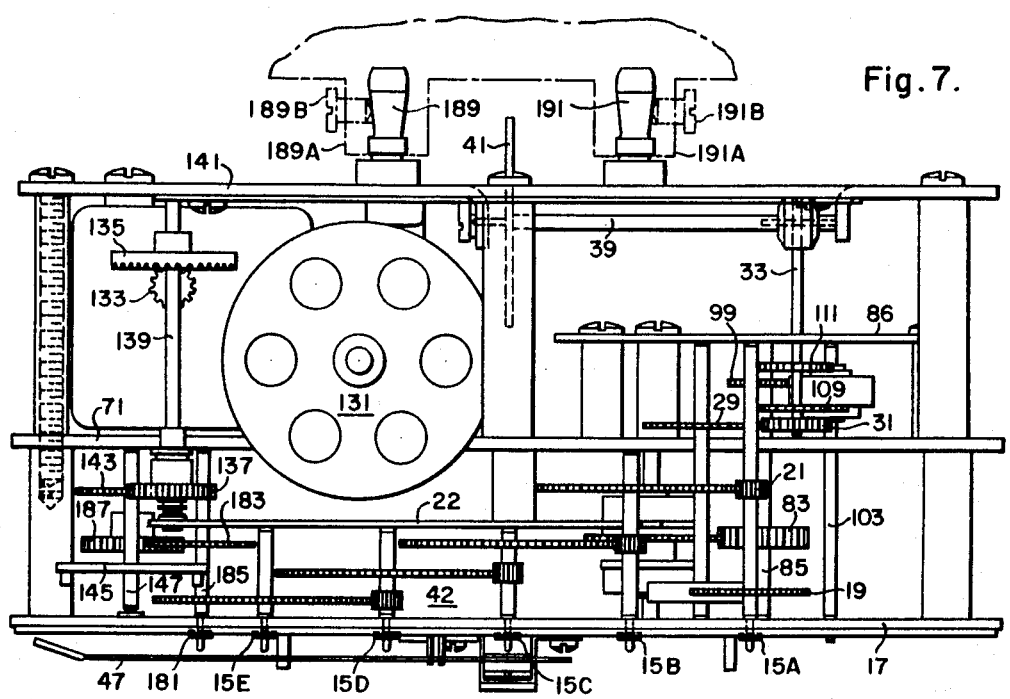
FIG. 7 is a view in top plan of the measuring device shown in FIG. 1.
Figure 8:
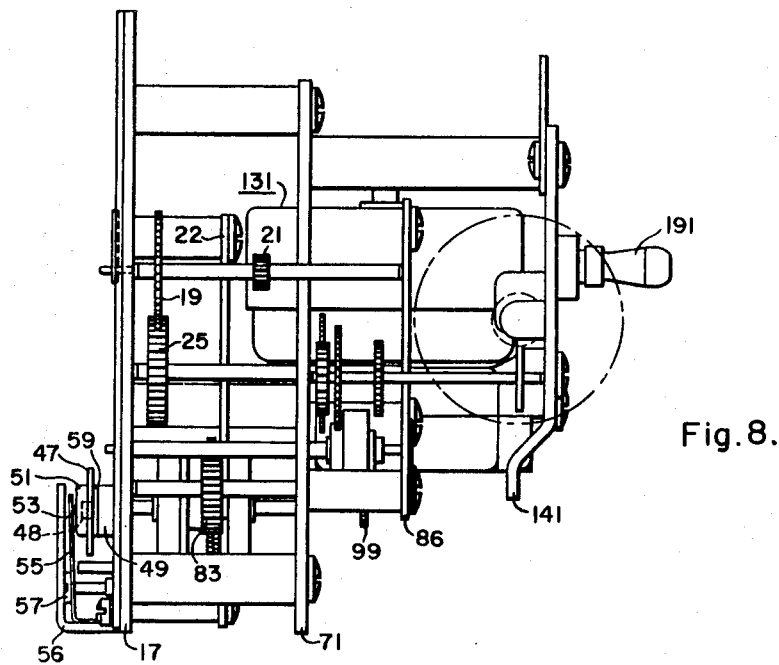
FIG. 8 is a view in side elevation of the measuring device shown in FIG. 1.

Referring to the drawings, FIG. 1 shows a measuring device which includes a maximum-demand register 11 for measuring the maximum-demand of a variable quantity. Although various quantities may be measured it will be assumed for present purposes that electrical energy is to be measured. For present purposes, it will be assumed that electrical energy is being measured by a conventional induction-disk-type electrical watt-hour meter which is represented in FIG. 1 by its shaft 13. It will be understood that the shaft 13 rotates at a rate dependent upon the electrical power being supplied to an electrical circuit with which the watt-hour meter is associated.

For indicating maximum-demand, the dial plate 17 has an arcuate scale member 44 releasably secured thereto in any suitable manner as by machine screws 45. This scale member 44 is symmetrical about a vertical axis except for a tongue 44A. When the scale member 44 is reversed about a vertical axis to the position illustrated in FIG. 9, the tongue 44A modifies certain gearing in order to adjust the range of the register in a manner which will be discussed below. In the position illustrated in FIG. 9, the scale member 44 presents a scale which differs from the scale shown in FIG. 1 and which is designed to correspond to the new range of the register.

In order to show the demand an indicating member such as a maximum-demand pointer 47 is mounted for rotation relative to the dial plate 17 to indicate demand on the scale member 44. The pointer 47 is mounted for rotation about a shaft 48 secured to a collar 49 (FIG. 8) which in turn is secured to the dial plate 17. In its zero position, the pointer 47 engages a stop 61 which is secured to the dial plate 17 and if moved beyond its full scale position the pointer engages a stop 63 which also is secured to the dial plate.

In order to operate the pointer 47, a pusher member 65 is mounted on a shaft 67 for rotation about the axis of rotation of the pointer 47. The pusher member 65 has a portion located beneath the pointer 47. Consequently, clockwise rotation of the pusher member as viewed from the front of the register can actuate the pointer 47 up scale.

Although a single pusher member may be employed for actuating the pointer 47, it is desirable to use a second pusher member 69 which has a portion located below the pointer 47 as viewed in FIG. 1.

The pusher members are alternately and preferably sequentially coupled through a gear 97 to a gear 83 which is secured to a shaft 85 mounted for rotation in the plates 17 and 86. The term sequential is employed to indicate the absence of any overlap in the couplings.

In accordance with the invention a dual-range mechanism is provided wherein the shaft 85 (FIG. 1) has secured thereto a gear 99 which permanently meshes with a gear 101. This gear 101 is mounted on a shaft 103 for rotation relative to the shaft, and the shaft is mounted for rotation by the plates 17, 86. The shaft 103 has portions 103A and 103B of reduced diameter projecting through the plates 17 and 86. The shafts is biased in a forward direction by means of a leaf spring 105 and has a portion of reduced diameter extending beyond the dial plate 17 when the parts are in the positions illustrated in FIG. 1. The gear 101 has secured thereto a pinion 107 which meshes with a pinion 109 secured to the shaft 33 which is coupled to the meter shaft 13. Consequently, the gear 83 is rotated in accordance with rotation of the shaft 13. The gear 101 and the pinion 107 rotate as a unit relative to the shaft on which they are mounted. They may be held against axial displacement in any suitable way as by split spring washers or C-rings 94 which snap into grooves in the shaft 103.

When the scale plate 44 of FIG. 1 is rotated about a vertical axis to the position illustrated in FIG. 9, a portion of the scale plate such as the tongue 44A engages the projection 103A of the shaft 102 and forces the shaft rearwardly against the bias of the spring 105. This moves the gear 107 out of engagement with the gear 109 and simultaneously moves the gear 101 into engagement with a gear 111 which also is secured to the shaft 33. The gear 101 has an axial length sufficient to permit such movement without losing its meshing engagement with the gear 99. This gear change requires a much greater number of rotations of the shaft 13 to produce the same angular rotation of the gear 83. For example, twice as many rotations of the shaft 13 may be required as a result of the gear change. It will be understood that the calibration of the scale plate 44 which is exposed when the scale plate has the position shown in FIG. 9 is designed to present the correct demand reading.

The operation of the demand register now may be set forth. Let it be assumed that the parts are in the positions illustrated in the drawings and that the synchronous motor 131 and the watt-hour meter operating the shaft 13 are both energized. Inasmuch as the shaft 13 is now coupled to the pusher member 65, the pusher member rotates about its axis in accordance with rotation of the shaft 13. As the pusher member rotates, it pushes the demand pointer 47 up scale.

By the end of a 15 minute interval, the pusher member 65 has pushed the demand pointer 47 up scale to a value corresponding to the demand measured by the associated watt-hour meter for such 15 minute interval. At this time, the pusher arm 69 is coupled for operation in accordance with rotation of the watt-hour meter shaft 13.

During the next 15 minute interval, the pusher arm 69 moves in an up scale direction and if the demand during this interval exceeds that represented by the position of the pointer 47, the pusher arm 69 engages the pointer 47 to push the pointer further up scale. During this period the pusher arm 65 is reset. At the end of the second 15 minute interval the pusher arm 65 again is coupled to the shaft 13 and the pusher arm 69 is reset.

This cycle is repeated during the billing period which may be of the order of one month. At the end of the billing period a meter reader may read the kilowatt hours indicated by the register for the billing period and also the maximum-demand indicated by the pointer 47 for such period. The meter reader then may reset the pointer 47 to its zero position or into engagement with the effective one of the pusher members at such time to condition the register for the next billing period. Such a resetting operation of a pointer is well understood in the art.

A measuring device incorporating a modified form of the invention is shown in FIGS. 10 to 13. This measuring device may be similar to that of FIGS. 1 to 9 except for the features noted below.

Figure 10:
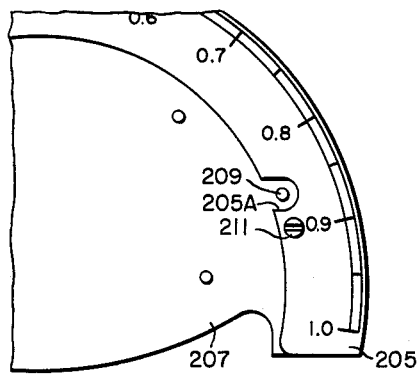
FIG. 10 is a view in front elevation with parts broken away of a measuring device embodying a modified form of the invention.
Figure 12:
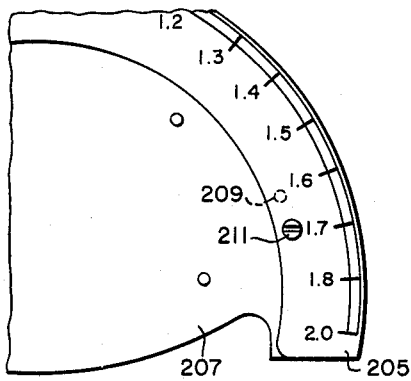
FIG. 12 is a view in front elevation with parts broken away of the measuring device of FIG. 10 with certain parts shown in different positions.

In FIG. 10 an arcuate scale member 205 having an exposed scale and a plate 207 correspond respectively to the scale member 44 and the plate 17 previously described. However, the scale member 205 has a uniform radial dimension except for a portion having a notch 205A proportional to clear the end of a control shaft 209 projecting through the plate 207. The scale member 205 is releasably attached to the plate 207 by screws 211 and may be reversed about a vertical axis to the position shown in FIG. 12 wherein a second face of the scale member presents a different scale. In FIG. 12 a portion of a scale member 205 overlies the shaft 209.

Figure 11:
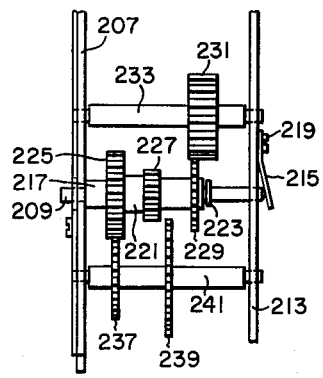
FIG. 11 is a view in side elevation with parts broken away of the measuring device of FIG. 10.

As shown in FIG. 11 the shaft 209 is mounted for axial reciprocation by the plate 207 and a plate 213. The shaft is biased by a leaf spring 215 towards the left as viewed in FIG. 11 to bring a collar 217 secured to the shaft into engagement with the plate 207. The leaf spring 215 has one end secured to the plate 213 by a screw 219.

A sleeve 221 is mounted for rotation on the shaft 209. Although free for rotation relative to the shaft 209, the sleeve 221 is restricted in axial movement relative to the shaft by the collar 217 and by a suitable retaining ring such as a split spring washer or C-ring 223 located in a groove provided in the shaft.

Three gears 225, 227 and 229 are mounted on the sleeve 221 for rotation therewith. One of the gears 229 meshes with a driving gear 231 on a shaft 233 that is mounted for rotation by the plates 207 and 213. The shaft 233 corresponds to the shaft 33 of the embodiment of FIGS. 1 to 9 and may be rotated similarly in accordance with a quantity to be measured.

The gears 225 and 227 have different diameters and are arranged to cooperate with two gears 237 and 239 secured to a shaft 241 which is mounted for rotation by the plates 207 and 213. In FIG. 11 the gears 225 and 237 are in mesh. Therefore, a first gear ratio is provided between the shafts 233 and 241 suitable for the scale exposed by the scale member 205.

Figure 13:
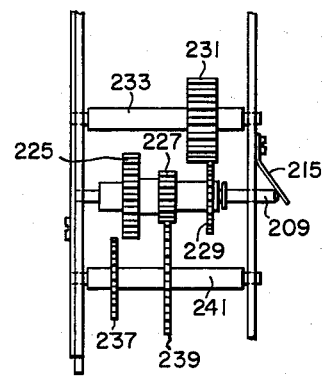
FIG. 13 is a view in side elevation with parts broken away of the measuring device of FIG. 12.

When the scale member 205 is reversed to the position illustrated in FIGS. 12 and 13, the shaft 209 is moved to the right as viewed in FIGS. 11 and 13 against the bias of the spring 215 without decoupling the gears 229 and 231. Such movement to the position shown in FIG. 13 decouples the gears 225 and 237 and couples the gears 227 and 239. This provides a second gear ratio between the shafts 233 and 241 suitable for the scale exposed by the scale member 205 in FIGS. 12 and 13. The shaft 241 corresponds to the shaft 85 of FIGS. 1 to 9 and may be employed for driving the gear 97 in a similar manner.

Inasmuch as the sleeve 221 rotates freely relative to the shaft 209 any friction introduced by the spring 215 does not affect rotation of the sleeve.

The shaft 209 has a limited travel and the mechanism provides a positive mechanical gear change which is reliable.

Although the invention has been described with reference to certain specific embodiments thereof, numerous modifications falling within the spirit and scope of the invention are possible.

I claim as my invention:

1. In a measuring device, a measuring unit for measuring a variable quantity, an indicating member for indicating a function of said variable quantity, gear means coupling the indicating member to the measuring unit for operation in accordance with the function of the variable quantity, said gear means having a first condition providing a first gear ratio, and a second condition providing a second gear ratio, a common planar scale member for said indicating member providing first and second interchangeable scales respectively on opposite faces of the scale member corresponding respectively to the first and second gear ratios, means selectively operable for mounting the scale member to position either of said scales for cooperation with said indicating member, and means responsive to interchange of said scales for selecting the correct one of said conditions for the scale in opertive position, said last-named means comprising a control element having first and second operating locations displaced from each other, biasing means effective when the scale member presents the first scale in operative position for biasing the control element into the first operating locations, and means responsive to interchange of said scales for moving the control element to the second operating location against said bias, said control element in the first operating location maintaining the gear means in the first condition, and the control element in the second operating location maintaining the gear means in the second condition.

2. In a measuring device, a measuring unit for measuring a variable quantity, an indicating member for indicating a function of said variable quantity, gear means coupling the indicating member to the measuring unit for operation in accordance with the function of the variable quantity, said gear means having a first condition providing a first gear ratio, and a second condition providing a second gear ratio, scale means for said indicating member providing first and second interchangeable scales corresponding respectively to the first and second gear ratios, and means responsive to interchange of said scales for selecting the correct one of said conditions for the scale in operative position, said last-named means comprising a control shaft, means guiding the shaft in an axial direction between first and second spaced operating locations, biasing means effective when the scale means presents the first scale in operative position for biasing the control shaft into the first operating location, means responsive to interchange of said scales for moving the control shaft to the second operating location against said bias, said gear means including a gear assembly mounted for rotation relative to the control shaft about the axis of the control shaft, retaining means restricting axial movement of the gear assembly relative to the control to the control shaft, said gear means when the control shaft is in the first operating location having gear mechanism cooperating with the gear assembly to establish said first condition, and the gear means when the control shaft is in the second operating location having gear mechanism cooperating with the gear assembly to establish said second condition.

3. In a maximum-demand measuring device, a measuring unit for measuring a variable quantity, an indicating member for indicating a function of said variable quantity, gear means coupling the indicating member to the measuring unit for operation in accordance with the maximum demand of the variable quantity, and scale means for said indicating member providing first and second interchangeable scales, said gear means including a driving shaft, a driven shaft, a structure supporting the shafts for independent rotation, a control shaft mounted by the structure for reciprocation between first and second axially-displaced locations, biasing means effective when the scale means provides the first scale for biasing the control shaft into the first location, means responsive to interchange of said scales for moving the control shaft against the bias to the second location, driving gear means mounted on the driving shaft, driven gear means mounted on the driven shaft, and coupling gear means mounted on the control shaft for rotation relative to the control shaft, and retaining means restricting axial movement of the coupling gear means relative to the control shaft, whereby the coupling gear means moves axially with the control shaft, said coupling gear means in the first location of the control shaft coupling the driving gear means to the driven gear means with a first gear ratio suitable for the first scale, said coupling gear means in the second location of the control shaft coupling the driving gear means to the driven gear means with a second gear ratio suitable for the second scale.

4. In a maximum-demand measuring device, a measuring unit for measuring a variable quantity, an indicating member for indicating a maximum-demand function of said variable quantity, gear means coupling the indicating member to the measuring unit for operation in accordance with the maximum-demand function of the variable quantity, said gear means having a first condition providing a first gear ratio, and a second condition providing a second gear ratio, scale means for said indicating member providing first and second interchangeable scales corresponding respectively to the first and second gear ratios, said scale means including a common planar scale member having the first scale displayed on a first face of the scale member and the second scale displayed on a second face of the scale member, means selectively operable for mounting the scale member with either of said scales displayed in operative position adjacent the indicating member, and means responsive to interchange of said scales for selecting the correct one of said conditions for the scale in operative position, said last-named means comprising a control shaft, means guiding the shaft in an axial direction between first and second spaced operating locations, biasing means effective when the scale means presents the first scale in operative position for biasing the control shaft into the first operating location, means responsive to interchange of said scales for moving the control shaft to the second operating location against said bias, said gear means including a gear assembly mounted for rotation relative to the control shaft about the axis of the control shaft, retaining means restricting axial movement of the gear assembly relative to the control shaft, said gear means when the control shaft is in the first operating location having gear mechanism cooperating with the gear assembly to establish said first condition, and the gear means when the control shaft is in the second operating location having gear mechanism cooperating with the gear assembly to establish said second condition.

5. In a maximum-demand measuring device, a measuring unit for measuring a variable quantity, an indicating member for indicating a function of said variable quantity, gear means coupling the indicating member to the measuring unit for operation in accordance with the maximum demand of the variable quantity, and scale means for said indicating member providing first and second interchangeable scales, said scale means including a common planar scale member having the first scale displayed on a first face of the scale member and the second scale displayed on a second face of the scale member, means selectively operable for mounting the scale member with either of said scales displayed in operative position adjacent the indicating member, said gear means including a driving shaft, a driven shaft, a structure supporting the shafts for independent rotation, a control shaft mounted by the structure for reciprocation between first and second axially-displayed locations, biasing means effective when the scale means provides the first scale for biasing the contrrol shaft into the first location, means carried by said scale member and responsive to interchange of said scales for moving the control shaft against the bias to the second location, driving gear means mounted on the driving shaft, driven gear means mounted on the driven shaft, and coupling gear means mounted on the control shaft for rotation relative to the control shaft, and retaining means restricting axial movement of the coupling gear means relative to the control shaft, whereby the coupling gear means moves axially with the control shaft, said coupling gear means in the first location of the control shaft coupling the driving gear means to the driven gear means with a first gear ratio suitable for the first scale, said coupling gear means in the second location of the control shaft coupling the driving gear means to the driven gear means with a second gear ratio suitable for the second scale.

References Cited by the Examiner
UNITED STATES PATENTS

| | | | |
|---|---|---|---|
| 2,000,736 | 5/35 | Ballantine | 324—116 |
| 2,132,256 | 10/38 | Cameron | 324—116 |
| 2,384,350 | 9/45 | Skulley | 324—115 |
| 2,885,639 | 5/59 | Tewksbury | 324—115 |
| 3,136,947 | 6/64 | Benbow | 324—103 |

WALTER L. CARLSON, *Primary Examiner.*

ELI J. SAX, *Examiner.*